United States Patent
Clark et al.

(10) Patent No.: US 7,241,182 B2
(45) Date of Patent: Jul. 10, 2007

(54) ANGLED RJ TO RJ PATCH PANEL

(75) Inventors: Gordon P. Clark, Eden Prairie, MN (US); John Schmidt, Shakopee, MN (US); Loren Mattson, Richfield, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/382,106

(22) Filed: May 8, 2006

(65) Prior Publication Data

US 2006/0194471 A1 Aug. 31, 2006

Related U.S. Application Data

(63) Continuation of application No. 10/860,177, filed on Jun. 3, 2004, now Pat. No. 7,066,771, which is a continuation of application No. 10/645,760, filed on Aug. 19, 2003, now Pat. No. 6,761,585, which is a continuation of application No. 09/991,077, filed on Nov. 16, 2001, now Pat. No. 6,736,670.

(51) Int. Cl.
*H01R 24/00* (2006.01)

(52) U.S. Cl. .................................... 439/676

(58) Field of Classification Search ............... 439/676, 439/540.1, 540, 709, 638
See application file for complete search history.

(56) References Cited

U.S. PATENT DOCUMENTS

| | | | |
|---|---|---|---|
| 4,290,664 A | 9/1981 | Davis et al. | |
| 4,367,908 A | 1/1983 | Johnston | |
| 4,379,609 A | 4/1983 | Hardesty | |
| 4,438,998 A | 3/1984 | Myers | |
| 4,460,234 A | 7/1984 | Bogese | |
| 4,593,966 A | 6/1986 | Meyer | |
| 4,657,330 A | 4/1987 | Levy | |
| 4,806,117 A | 2/1989 | Johnston | |
| 4,904,209 A | 2/1990 | Nelson | |

(Continued)

FOREIGN PATENT DOCUMENTS

DE 295 21 330 US 1/1997

(Continued)

OTHER PUBLICATIONS

L-com® Connectivity Products, "L-com ECF Product Literature (excerpts)," 5 pages (Date Unknown).

(Continued)

*Primary Examiner*—J. F. Duverne
(74) *Attorney, Agent, or Firm*—Merchant & Gould P.C.

(57) ABSTRACT

A patch panel including a plurality of electrical connector assemblies, each of the electrical connector assemblies including a first jack presented on a first side of a panel frame of the patch panel and a second jack electrically linked to the first jack to form a jack pair and presented on a second side of the panel frame. Both the first jack and the second jack are presented at an angle with respect to the panel frame, and both the first jack and the second jack may be engaged using a patch cord. The first and second jack of each jack pair are at a 90-degree angle relative to one another.

10 Claims, 15 Drawing Sheets

U.S. PATENT DOCUMENTS

| | | | |
|---|---|---|---|
| 4,905,275 | A | 2/1990 | Meyerhoefer et al. |
| 4,944,698 | A | 7/1990 | Siemon et al. |
| 4,995,688 | A | 2/1991 | Anton et al. |
| 5,030,123 | A | 7/1991 | Silver |
| 5,044,981 | A | 9/1991 | Suffi et al. |
| 5,074,801 | A | 12/1991 | Siemon |
| 5,129,842 | A | 7/1992 | Morgan et al. |
| 5,139,445 | A | 8/1992 | Below et al. |
| 5,161,988 | A | 11/1992 | Krupka |
| 5,178,554 | A | 1/1993 | Siemon et al. |
| 5,269,708 | A | 12/1993 | DeYoung et al. |
| 5,328,390 | A | 7/1994 | Johnston et al. |
| 5,366,388 | A | 11/1994 | Freeman et al. |
| 5,531,612 | A | 7/1996 | Goodall et al. |
| 5,639,261 | A | 6/1997 | Rutkowski et al. |
| 5,658,166 | A | 8/1997 | Freeman et al. |
| 5,685,742 | A | 11/1997 | Reynolds |
| 5,708,742 | A | 1/1998 | Beun et al. |
| 5,721,776 | A | 2/1998 | McLean et al. |
| 5,836,786 | A | 11/1998 | Pepe |
| 5,931,703 | A | 8/1999 | Aekins |
| D417,434 | S | 12/1999 | Chang |
| 6,031,909 | A | 2/2000 | Daoud |
| D421,964 | S | 3/2000 | Nagasawa et al. |
| 6,036,547 | A | 3/2000 | Belopolsky et al. |
| 6,053,764 | A | 4/2000 | Curry et al. |
| 6,068,520 | A | 5/2000 | Winings et al. |
| 6,123,577 | A | 9/2000 | Contois et al. |
| 6,142,834 | A | 11/2000 | Liao |
| 6,146,192 | A | 11/2000 | Calbalka et al. |
| 6,146,207 | A | 11/2000 | Mulot |
| 6,168,474 | B1 | 1/2001 | German et al. |
| 6,176,741 | B1 | 1/2001 | Shutter |
| 6,193,560 | B1 | 2/2001 | Morana et al. |
| 6,231,380 | B1 | 5/2001 | Cabalka et al. |
| 6,234,832 | B1 | 5/2001 | Belopolsky et al. |
| 6,234,836 | B1 | 5/2001 | Schmidt et al. |
| 6,296,534 | B1 | 10/2001 | Yi |
| 6,302,742 | B1 | 10/2001 | Berst et al. |
| 6,319,066 | B2 | 11/2001 | Kuo |
| 6,352,447 | B1 | 3/2002 | Ruth |
| 6,358,093 | B1 | 3/2002 | Phommachanh et al. |
| 7,066,771 | B2 * | 6/2006 | Clark et al. .................. 439/676 |

FOREIGN PATENT DOCUMENTS

| | | |
|---|---|---|
| EP | 0 514 638 A1 | 3/1992 |
| EP | 0 901 198 A2 | 12/1993 |
| EP | 0 718 926 A2 | 6/1996 |
| EP | 0 777 304 A2 | 11/1996 |
| EP | 1 186 921 A2 | 9/2001 |
| EP | 1 217 402 A2 | 11/2001 |
| WO | WO 99/45611 | 9/1999 |
| WO | WO 99/63628 | 12/1999 |
| WO | WO 00/28363 | 5/2000 |

OTHER PUBLICATIONS

Ortronics, Inc., "Specialty Panels and Hubs," http://www.ortronics.com/products/products/m_patch_panels, 5 pages (2000).

Stewart Connector Systems, Inc., "71 Series. AngleJack Vertical Modular Jacks," http://www.stewartconnector.com/products/modular/anglejack.htm, 6 pages (1999).

The Siemon Company, Catalog 1999, Front Cover page, Table of Contents, pp. 1.3-1.5, and Back Cover page (1999).

UNICOM Electric, Inc., "Category 5c and 5 Feed-Thru Panels," http://www.unicomlink.com/wiring/feed.html, 1 page (1995).

"Angled Entry Jack Shielded Cat 6," Tyco Electronics, 1 page (Mar. 2, 2001).

"Coupler Assembly, 6 Position, Right Angle," AMP Incorporated, 1 page (Jul. 29, 1984).

ADC Telecommunications, Inc., "Enteraprise™ Structural Connectivity System Patch Panels" 100054PR, Dec. 2000, 21 pgs.

ADC Telecommunications, Inc., "ADC REZ™, Home Networking Solutions" 100318PR, Sep. 2000, 2 pages.

ADC Telecommunications, Inc., "Enteraprise™ Network Essentials for ADC" M168, May 2000, 8 pages.

ADC Telecommunications, Inc., "Network Connectivity Solutions" M143, Feb. 2001, Front Cover page, Table of Contents (2 pages), pp. 1-41, and Back Cover page.

Photographs of ATS Slimline™ Adapter EIA T568 A/B PS-Cat 5+, P/N C5RJT155* (admitted prior art as of the effective filing date of the application).

* cited by examiner

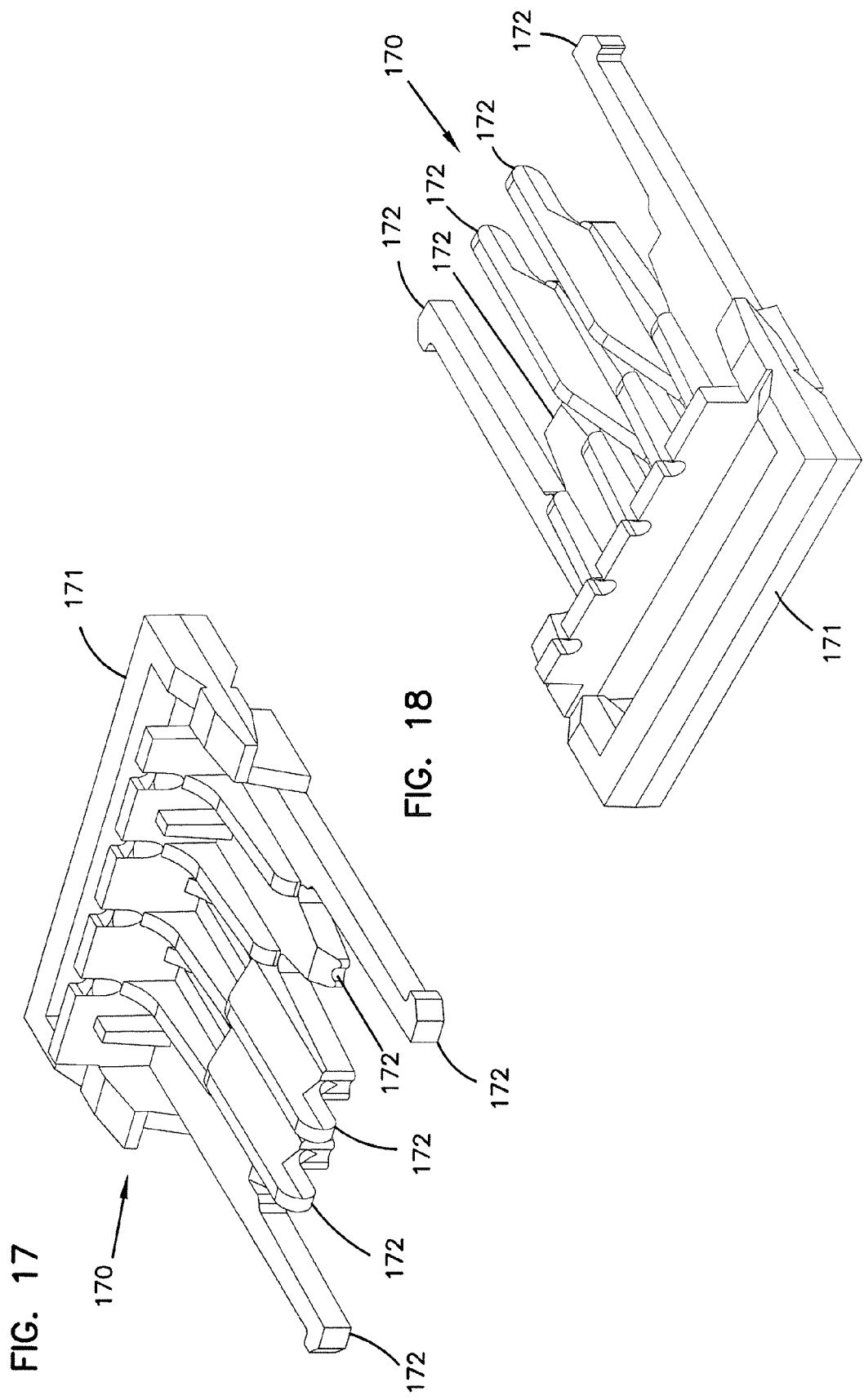

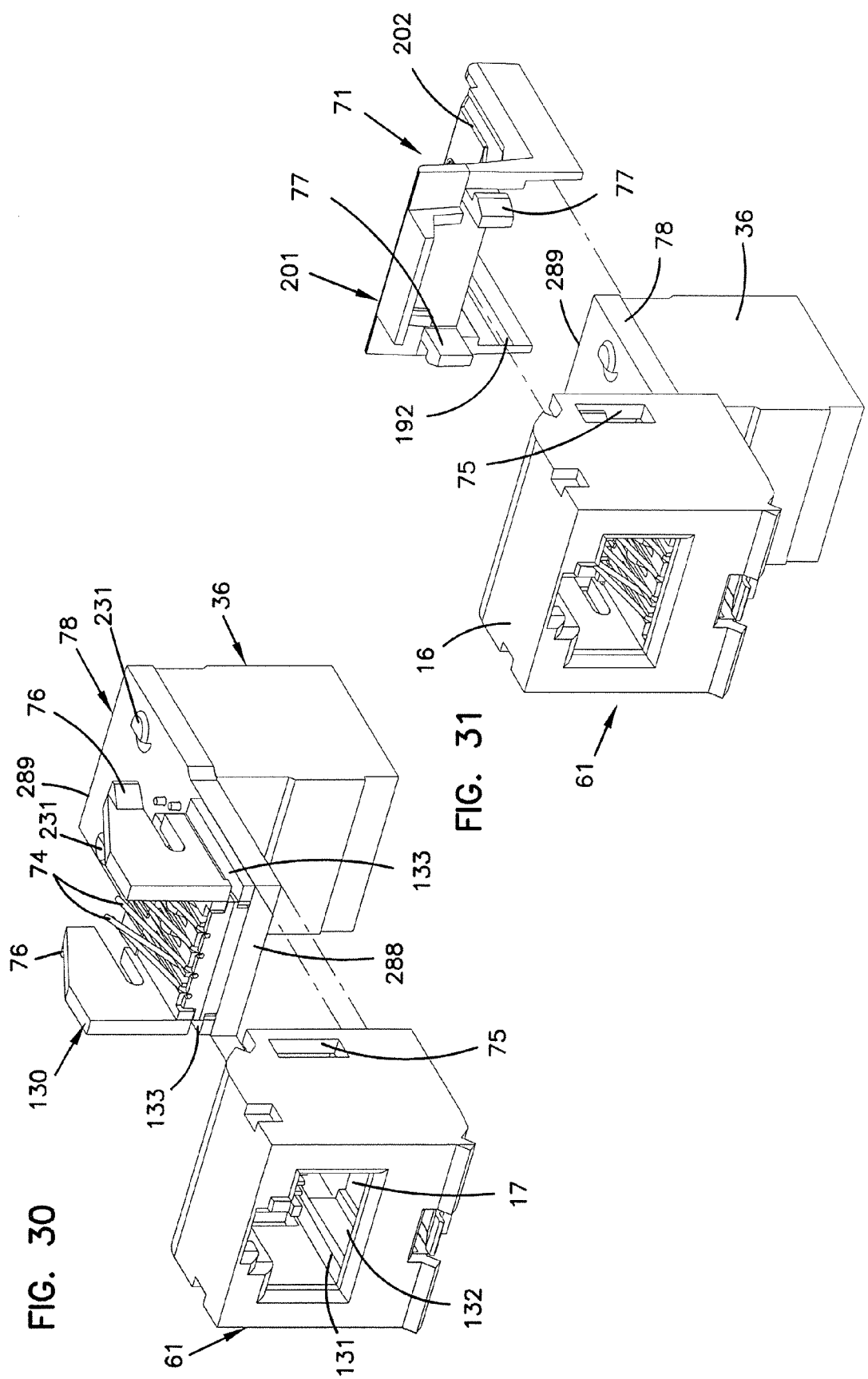

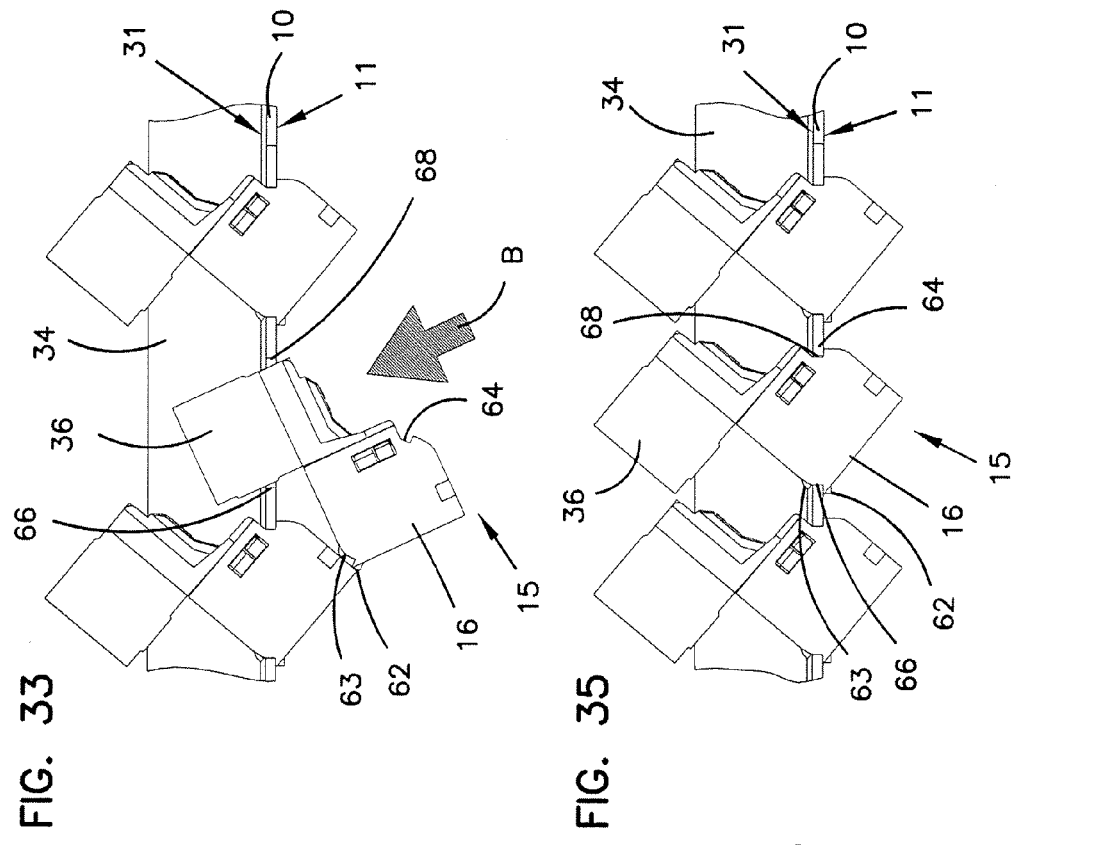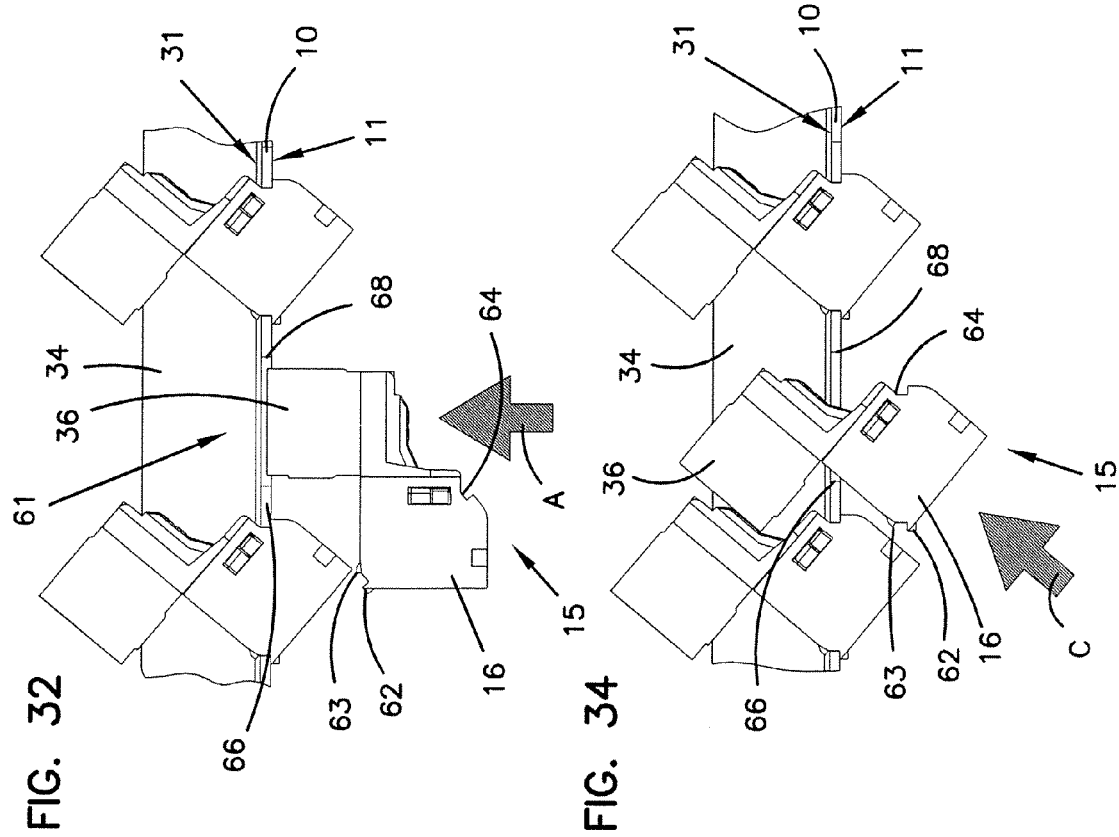

ANGLED RJ TO RJ PATCH PANEL

RELATED APPLICATIONS

This application is a continuation of application Ser. No. 10/860,177, filed Jun. 3, 2004 now U.S. Pat. No. 7,066,771, which is a continuation of application Ser. No. 10/645,760, filed Aug. 19, 2003 now U.S. Pat. No. 6,761,585, which is a continuation of application Ser. No. 09/991,077, filed Nov. 16, 2001, now U.S. Pat. No. 6,736,670, which applications are incorporated herein by reference.

TECHNICAL FIELD

The present invention relates to a telecommunications connecting panel and, more particularly, to a patch panel including angled RJ-45 jacks disposed on both front and rear sides of the patch panel.

BACKGROUND

Local area networks and telecommunications connections often use patch panels, especially at the customer's premises, to enable inter- or cross-connection between telecommunications equipment. Patch panels typically comprise a frame member including plurality of connector locations wherein any of a variety of jacks, including, but not limited to, copper and fiber, may be mounted. The jacks allow for fairly rapid connection and disconnection between two jacks in the same patch panel, or between one jack in the patch panel and another jack in a nearby patch panel, with a patch cord. One type of jack and plug arrangement for a patch panel is an RJ-45 type connector, described in U.S. Pat. No. 5,639,261. Other patch panels and jacks are shown and described in U.S. Pat. Nos. 5,299,956 and 5,674,093.

Each jack in a patch panel typically terminates with a plurality of punch down type connectors, usually referred to as insulation displacement connectors (IDCs), positioned through the patch panel on a rear side of the patch panel. An IDC allows for termination of individual conductor wires to a designated jack. An installer is required to correctly position and terminate each conductor wire to the correct IDC on the correct jack. The individual conductor wires may then be run to a desired termination.

Various concerns arise in the use of IDCs. One concern is that the use of an IDC requires a skilled installer to correctly select the appropriate IDC among the plurality of IDCs for each jack. Further, the installer must be familiar with and skilled at using IDCs so as to strip the insulation from the conductor wire so as to assure a reliable connection.

There is a need for improved patch panels and methods to terminate to such patch panels.

SUMMARY

An electrical connector assembly according to one aspect of the invention includes a first jack including a first housing, a first port defined by a first front side of the first housing, and a plurality of first springs disposed within the first port adjacent a first bottom of the first housing as well as a second jack including a second housing, a second port defined by a second front side of the second housing, and a plurality of second springs disposed within the second port adjacent a second bottom of the second housing. An electrical connection is formed between the plurality of first and second springs, wherein the first jack is positioned at a 90-degree angle in relation to the second jack such that a first line running parallel to the first bottom and through the first front side and the first back side is perpendicular to a second line running parallel to the second bottom and through the second front side and the second back side, and wherein the first line and second line intersect at a point outside the first and second housings.

According to another aspect of the present invention, an electrical connector assembly may include a first jack including a first housing, a first port defined by a first front side of the first housing, and a plurality of first springs disposed within the first port adjacent a first bottom of the first housing as well as a second jack including a second housing, a second port defined by a second front side of the second housing, and a plurality of second springs disposed within the second port adjacent a second bottom of the second housing. Also includes is a board, wherein the board includes first and second ends and top and bottom surfaces, and wherein the first jack is coupled to the first end and the top surface of the board so that the first port opens outwardly in parallel with the first end and the second jack is coupled to the second end and the bottom surface so that the second port opens outwardly perpendicular to the bottom surface, the board including electrical connections between the plurality of first and second springs.

In accordance with a further aspect of the invention, a patch panel may include a first panel side and a second panel side, a plurality of first jacks disposed on the first panel side, such that each of the plurality of first jacks is positioned at a 45-degree angle in relation to the first panel side, and a plurality of second jacks electrically connected to the first jacks to form jack pairs, the second jacks being disposed on the second panel side, such that each of the plurality of second jacks is positioned at a 45-degree angle in relation to the second panel side, wherein the first and second jacks of each jack pair are positioned at a 90-degree angle in relation to each other.

According to another aspect of the present invention, the telecommunications patch panel may include a panel frame including a first panel side and a second panel side, at least one first jack disposed on the first panel side, such that the first jack is positioned at a first angle less than 90-degrees in relation to the first panel side, and at least one second jack disposed on the second panel side, such that the second jack is positioned at a second angle less than 90-degrees in relation to the second panel side, the at least one first jack electrically connected to the at least one second jack to form a jack pair, each jack having a directional component facing in the same direction for each jack pair.

According to another aspect of the present invention, a connector assembly for use in a telecommunications patch panel may include a jack assembly having an first jack including a first housing and a first port defined by a first front side of the first housing and a second jack comprising a second housing; and a second port defined by a second front side of the second housing. Also included may be a latch arrangement for mounting the jack assembly to a planar opening defined by the telecommunications patch panel, wherein the first housing is coupled to the second housing such that the first port is at a first angle in relation to the second port, and wherein when the connector is disposed and latched within the planar opening, the first housing is at a second angle with respect to a first side of the panel frame and the second housing is at the second angle with respect to a second side of the panel frame.

In accordance with another aspect of the invention, a method of assembling a telecommunications patch panel may include the steps of: providing a connector assembly comprising a first jack including a first port and a second jack including a second port, wherein the first jack and the second jack are positioned at a 90-degree angle with respect to one another; positioning the connector assembly adjacent to a connector location defined by a panel frame of the telecommunications patch panel such that the second port is adjacent to a first side of the telecommunications patch panel; inserting and rotating the connector assembly in relation to the telecommunications patch panel so that the second jack is shifted through the connector location to a second side of the telecommunications patch panel; seating a first portion of the connector assembly on a first side surface of the connector location; and snapping a second portion of the first jack to engage a second side surface of the connector location such that the first jack is positioned at a 45-degree angle with respect to the first side of the telecommunications patch panel and the second jack is positioned at a 45-degree angle with respect to the second side of the telecommunications patch panel.

BRIEF DESCRIPTION OF THE DRAWINGS

FIGS. 7 and 8 are front perspective and rear perspective views, respectively, of an embodiment of an electrical connector assembly in accordance with the present invention.

FIGS. 17 and 18 are front perspective and rear perspective views, respectively, of an embodiment of a front entry clip in accordance with the present invention.

FIGS. 30 and 31 are perspective views illustrating assembly of an embodiment of a housing and cover onto an angled jack in accordance with the present invention.

FIGS. 32–35 are top views illustrating coupling of an embodiment of an electrical connector assembly to a patch panel in accordance with the present invention.

DETAILED DESCRIPTION OF THE PREFERRED EMBODIMENT

Figure 1:
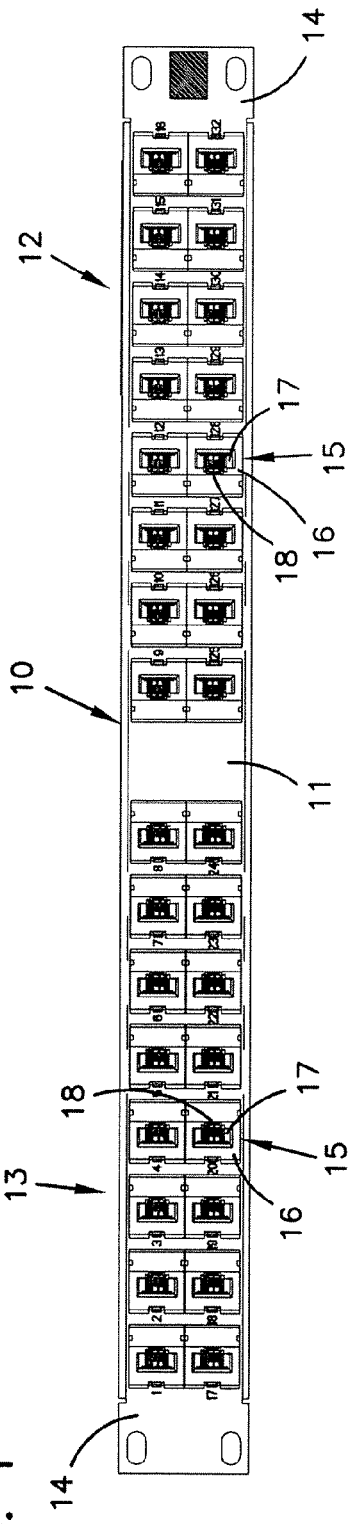
FIGS. 1 and 2 are front elevation and front perspective views, respectively, of an embodiment of a patch panel in accordance with the present invention including a plurality of electrical connector assemblies.
Figure 2:
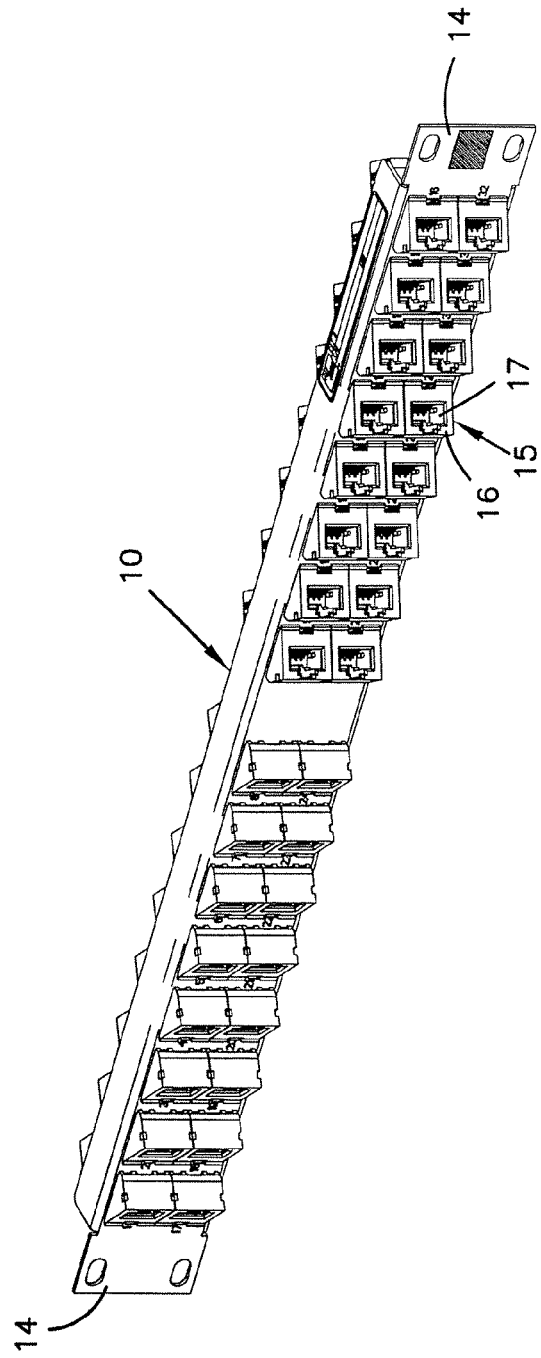

Referring now to FIGS. 1 and 2, an embodiment of a patch panel 10 with a front surface 11 is illustrated including mounting portions 14 which allow the patch panel 10 to be mounted to such structures as a rack or cabinet. A plurality of electrical connector assemblies 15 are shown coupled to the patch panel 10. Each of the electrical connector assemblies 15 comprises a first jack 16 and a second jack 36 electrically connected to one another. Each jack 16 and 36 receives a patch cord plug (not shown). Each jack 16 and 36 is disposed at an angle to the panel so that each patch cord is angled toward the same end of the patch panel.

In the example embodiment of connector assembly 15, the first jack is an angled jack 16 since it mounts to the patch panel in an angled configuration. The second jack is a modular jack 36 assembled to the angled jack 16 to form the connector assembly 15 (see FIGS. 3–4). In an example embodiment, both the angled jack 16 and the modular jack 36 are RJ-45 type jacks. However, it should be understood that other types of jacks may also be used without departing from the spirit of the invention.

Each angled jack 16 defines a port 17 including a latch groove 18. Each angled jack 16 is positioned at an angle with respect to the front surface 11 of the patch panel 10. In an example embodiment of the invention, the angled jacks 16 are positioned at a 45-degree angle with respect to the front surface 11, however other similar angles may also be used. Further, the ports 17 of each of the angled jacks 16 or a group of angled jacks 16 may be oriented in different directions, such as first angled jack group 12 and oppositely-oriented second angled jack group 13. Each angled jack 16 may accommodate a plug (not shown) such as a patch cord used to interconnect two jacks. Each plug includes conductive contacts for making electrical contact with the springs of each jack.

When a corresponding plug is mated with the angled jack 16 within the port 17, a clip on the plug is positioned within the latch groove 18 to hold the plug in place. As best shown in FIG. 2, each of the ports 17 of each of the angled jacks 16 is positioned such that the latch groove 18 is at an outermost area of the angled jack 16. With the latch groove 18 in this position, a plug inserted into port 17 presents a plug clip on the plug that is spaced from the front surface 11 of the patch panel 10. This provides the user's thumb or finger with easy access to the plug clip when the plug is released from the port 17. The ease in accessing the plug clip facilitates rapid changeover and minimizes downtime.

Figure 3:
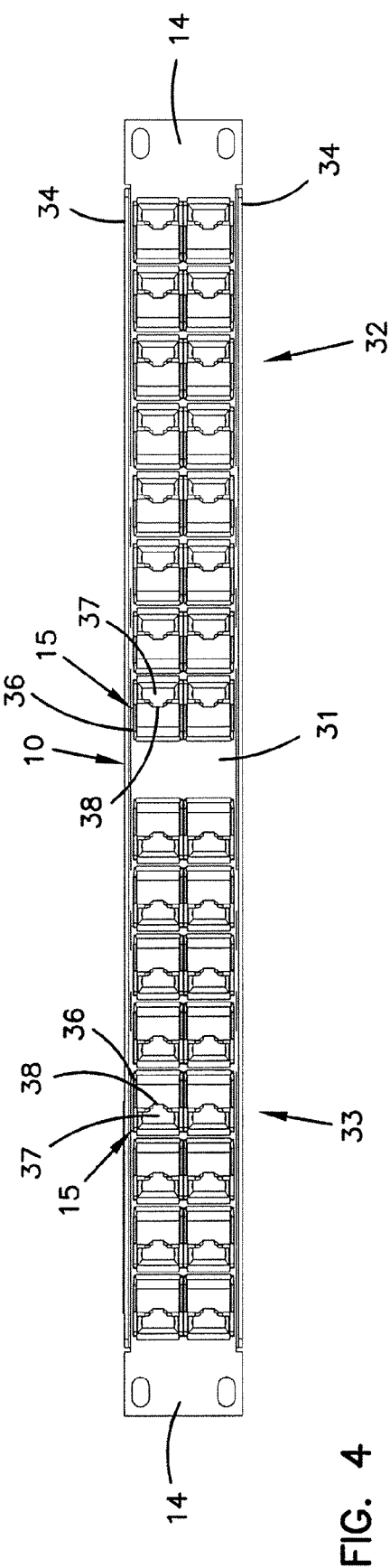
FIGS. 3 and 4 are rear elevation and rear perspective views, respectively, of the patch panel shown in FIG. 1.
Figure 4:
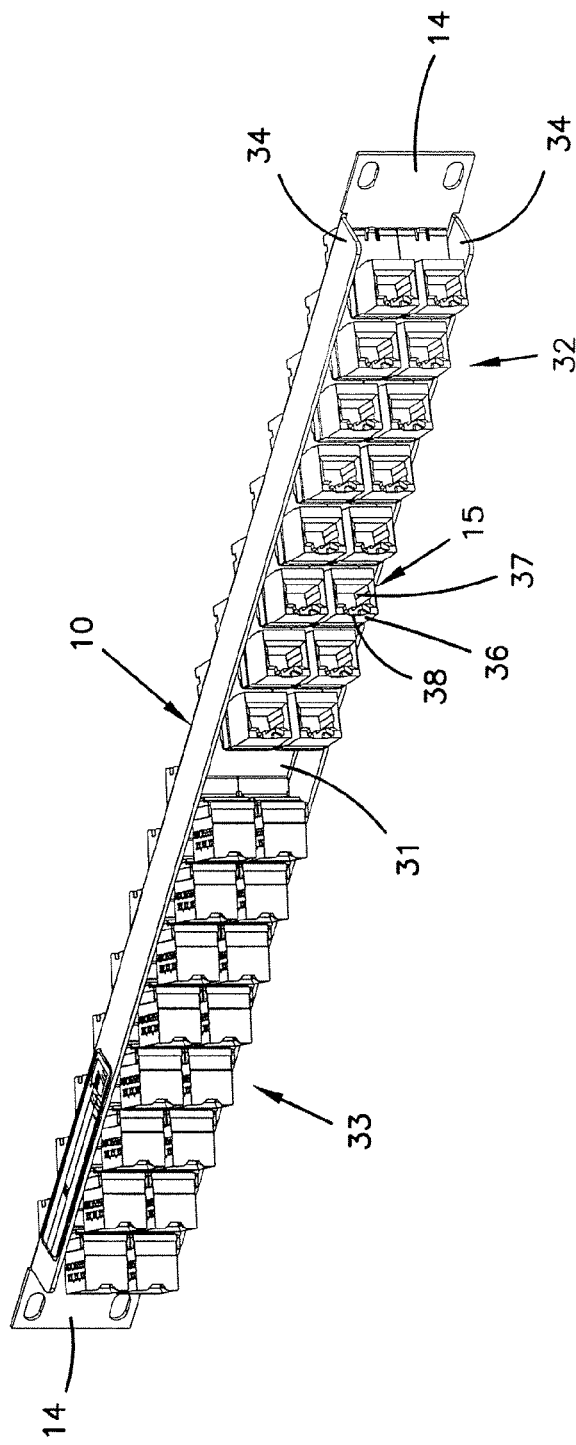

Referring now to FIGS. 3–4, the patch panel 10 is shown with a rear surface 31 and flanges 34, as well as the plurality of the electrical connector assemblies 15. The rear portion of each of the electrical connector assemblies 15 includes a modular jack 36 defining a port 37 with a latch groove 38. Similarly to the angled jacks 16, the modular jack 36 may accommodate a plug (not shown), and each modular jack 36 is positioned at an angle with respect to the rear surface 31 of the patch panel 10.

Conventional patch cords with plugs can be used for connecting to the modular jack 36, rather than the insulation displacement connectors (IDC) typically presented on the rear surface of patch panels requiring use of a plurality of wires. The modular jack 36 assures a good termination and reduces the potential for error in the selection of the appropriate jack.

In an example embodiment, each modular jack 36 is positioned at a 45-degree angle with respect to the rear surface 31. In addition, each the ports 37 of each modular jack or group of modular jacks 36 may be oriented in different directions, such as first modular jack group 32 and oppositely-oriented second modular jack group 33. Further, each of the latch grooves 38 on each of the modular jacks 36 are positioned on the modular jack 36 so as to be spaced from the rear surface 31 of the patch panel 10 to allow for easy removal of a plug clip of a plug inserted into the port 37. Cable management may be increased due to the angled jacks on both sides of the patch panel, reducing the twisting forces exerted on the patch cords. The unique configuration may allow for a greater density of jacks on the panel as well.

Figure 5:
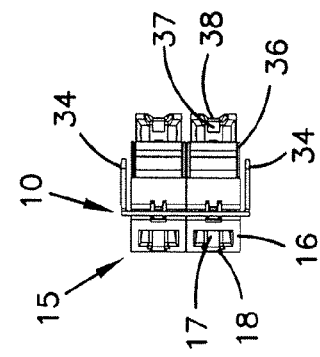
FIG. 5 is a side view of the patch panel shown in FIG. 1.

A side view of the patch panel 10 and plurality of electrical connector assemblies 15 is shown in FIG. 5. Both ports 17 and 37 are visible in the side view since the end assemblies face partially toward the side, as well as other assemblies in the group.

Figure 6:
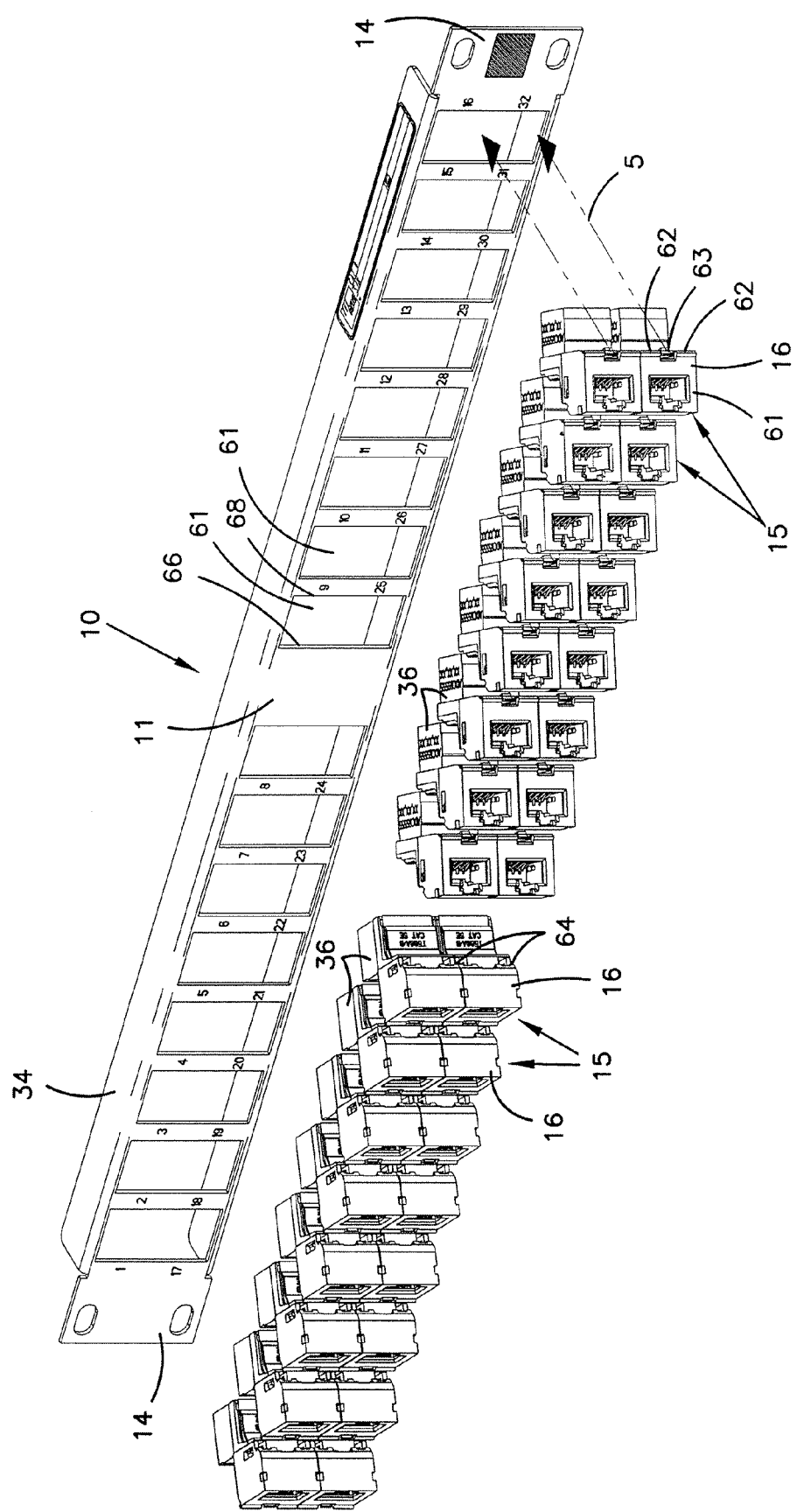
FIG. 6 is an exploded, front perspective view of the patch panel of FIGS. 1–5 in accordance with the present invention including a plurality of electrical connector assemblies.
Figure 10:
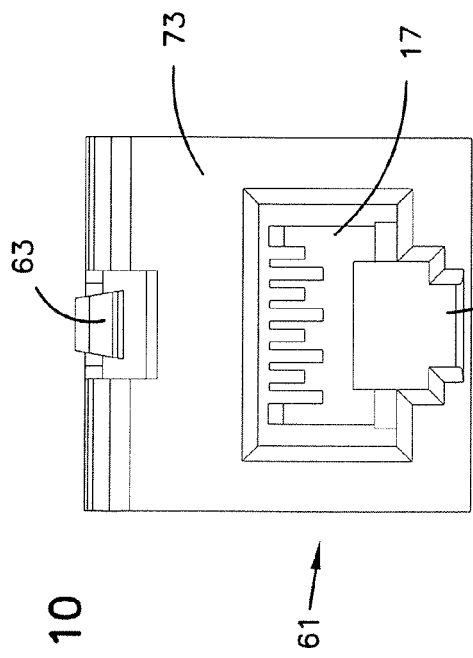
FIGS. 9–13 are front perspective, front, side, bottom, and rear views, respectively, of an embodiment of an angled jack housing in accordance with the present invention.
Figure 11:
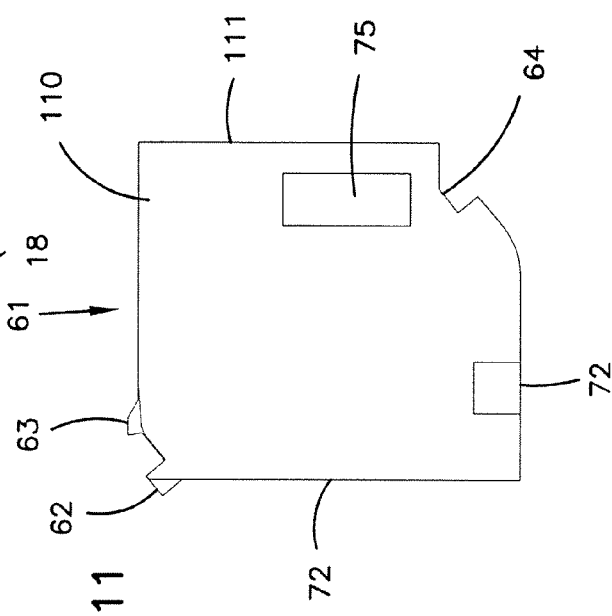
Figure 9:
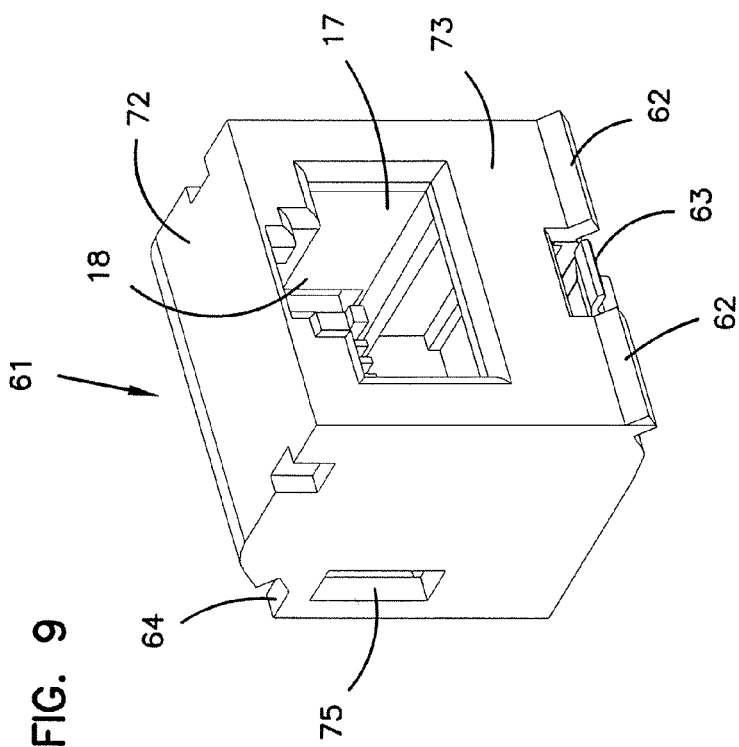
Figure 12:
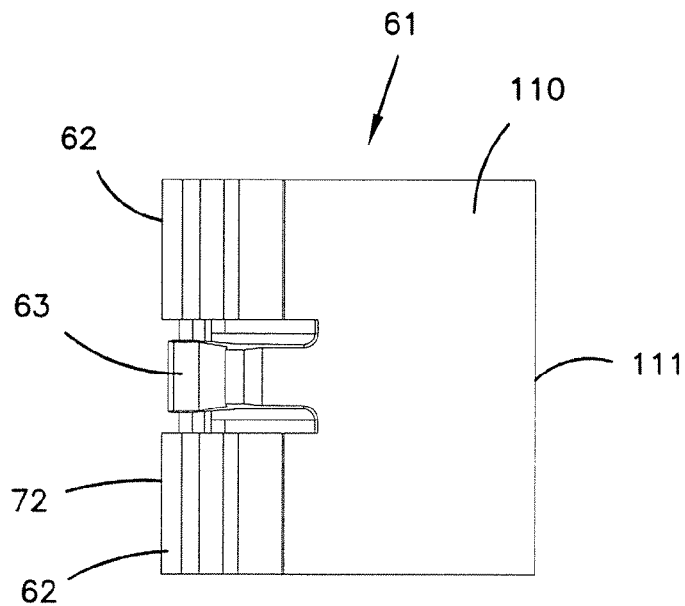

The patch panel 10 and electrical connector assemblies 15 are shown in exploded perspective view in FIG. 6. Each electrical connector assembly 15 may be inserted into a connector location 61 defined by the patch panel 10 generally in a direction 5, such that notches 64 formed in a housing 61 of the angled jack 16 are seated on a first side 66 of the connector location 61 and a pair of shoulders 62 and a latch 63 formed on the housing 61 of the angled jack 16 are positioned to surround a second side 68 of the connector location 61. In this manner, each of the electrical connector assemblies 15 may be coupled to the patch panel 10 such that the angled jack 16 is positioned at a 45-degree angle with respect to the front surface 11 and the modular jack 36 is positioned at a 45-degree angle with respect to the rear surface 31 of the patch panel 10.

Figures 7, 8:
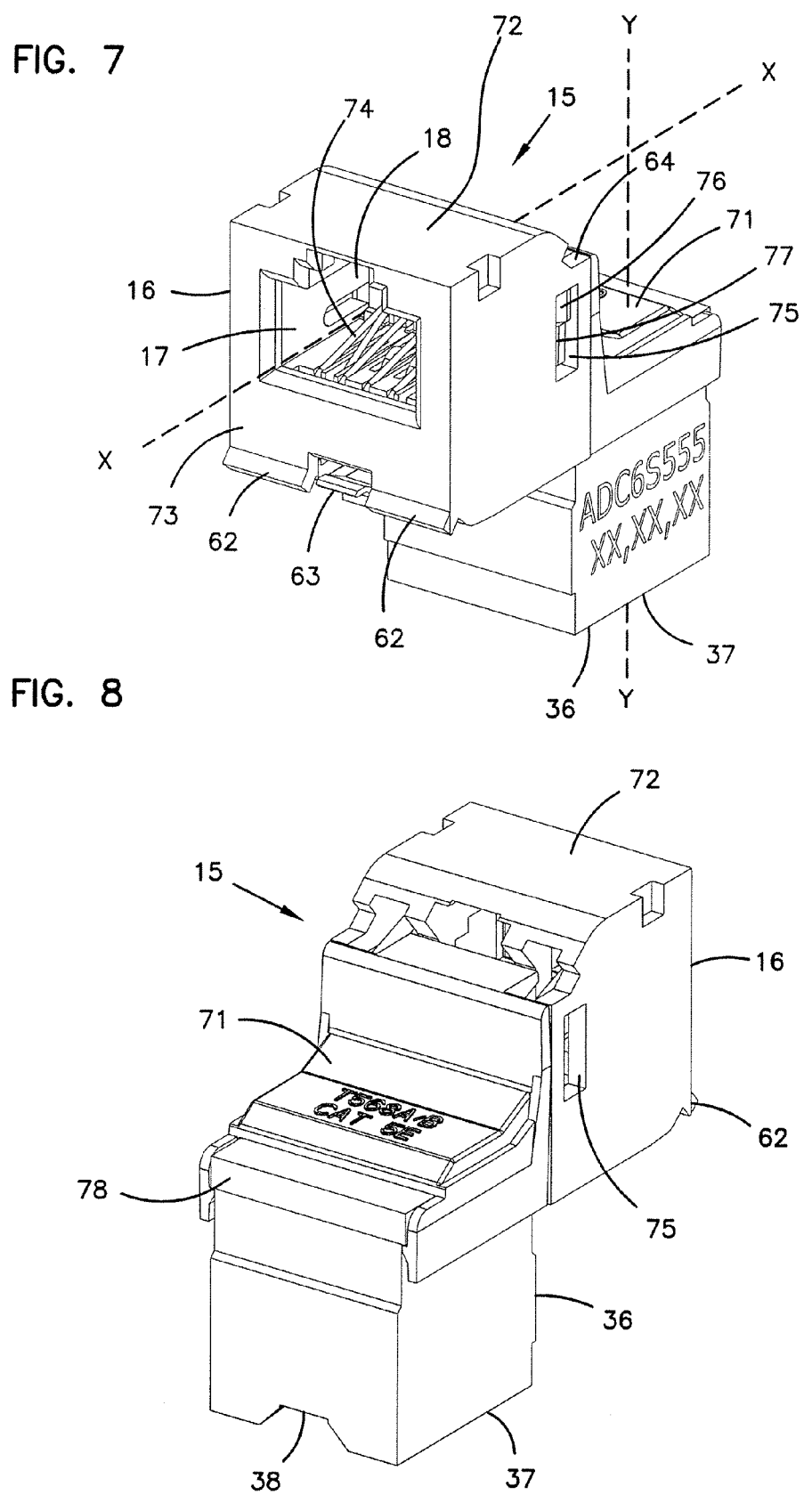

Referring now to FIGS. 7 and 8, the electrical connector assembly 15 is shown in greater detail. The housing 61 further includes a top 72 and a front 73 in which the port 17 is defined, as well as springs 74 that make electrical contact with complementary conductors on a plug (not shown). The housing 61 also defines apertures 75 into which locking tabs 76 and 77 are engaged (both locking tabs 76 and 77 are discussed below). Also shown in FIG. 8 is a board 78 on which both the angled jack 16 and the modular jack 36 are mounted and a cover 71 coupled to the board and the housing 61.

As FIGS. 7–8 illustrate, the angled jack 16 (and specifically the port 17) is positioned at an angle relative to the modular jack (and specifically the port 37). In this example embodiment, the port 17 of the angled jack 16 is positioned at a 90-degree angle with respect to the port 37 of the modular jack 36. Other angles may also be used without departing from the spirit of the invention. Further, the port 17 is positioned relative to the port 36 such that a line of plug insertion X—X drawn through the port 17 intersects a line of plug insertion Y—Y drawn through the port 37 at a point outside both the angled jack 16 and the modular jack 36. In this arrangement, the electrical connector assembly 15 may be coupled to the patch panel 10 as shown in FIG. 6.

Figure 13:
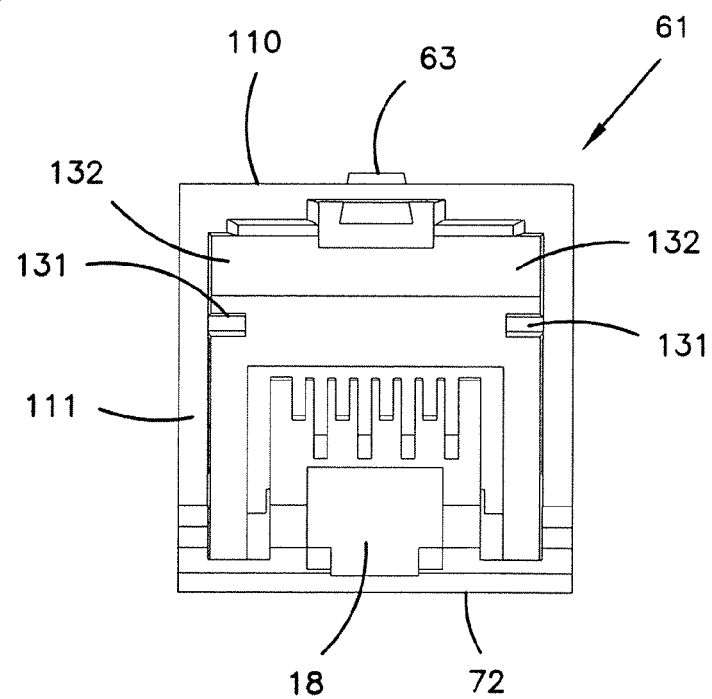

The housing 61 of the angled jack 16 is shown in greater detail in FIGS. 9–13. The notches 64, the shoulders 62, and the latch 63 can be seen in greater detail in FIGS. 11 and 12. The shoulders 62 and the latch 63 are formed adjacent the front 72 and a bottom 110 of the housing 61, while the notches 63 are formed opposite and adjacent the top 72 and a rear 111 of the housing 61. In FIG. 13, the rear 111 of the housing 61 is shown, including rails 131 defining grooves 132 between the rails 131 and the bottom 110 of the housing 61.

Figure 15:
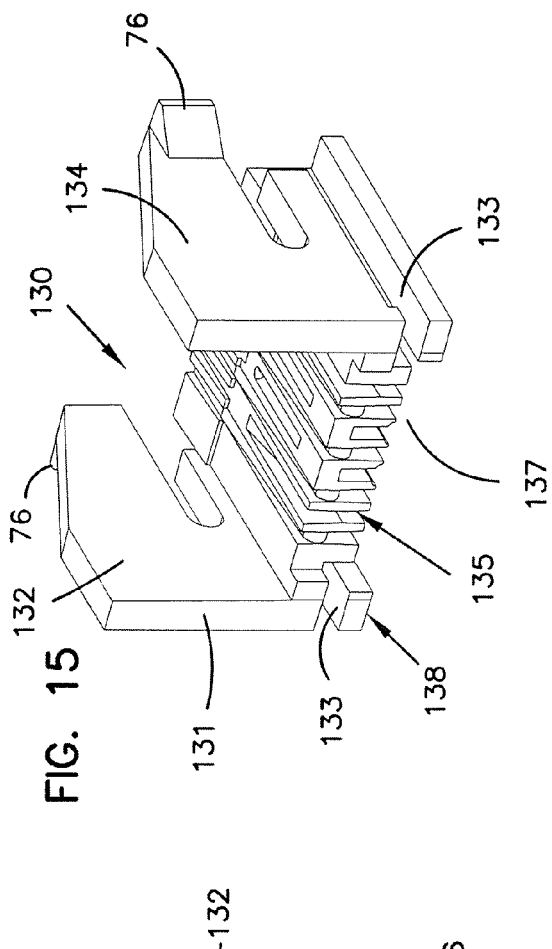
FIGS. 14–16 are front perspective, rear perspective, and side views, respectively, of an embodiment of a spring insert in accordance with the present invention.
Figure 16:
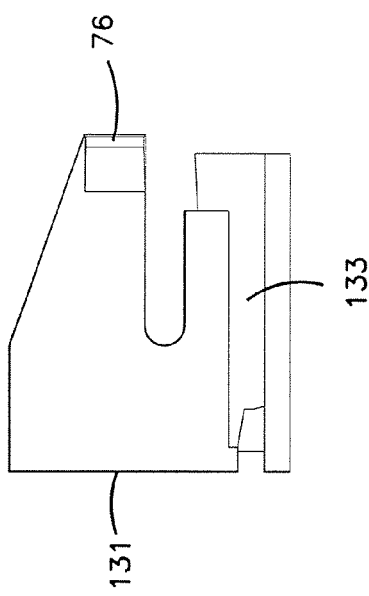
Figure 14:
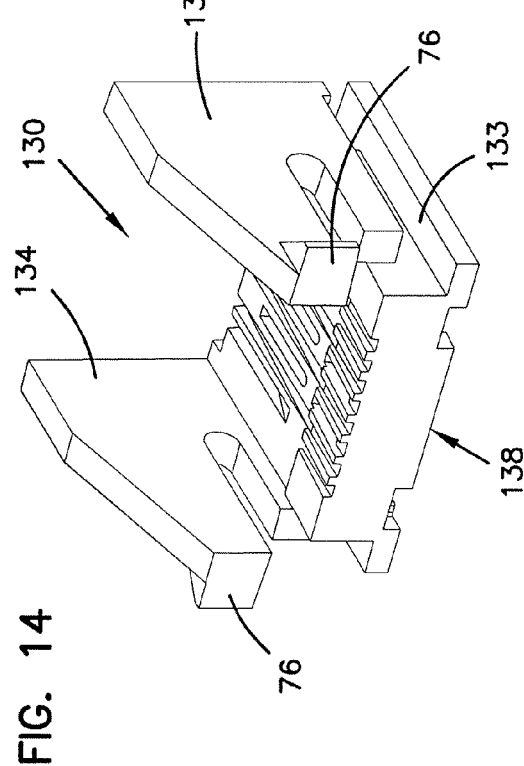

Shown in FIGS. 14–16 is a spring insert 130 in accordance with an example embodiment of the present invention. The spring insert 130 comprises a front 131 and sides 132 and 134, as well as railways 133 defined by the sides 132 and 134. The locking tabs 76 are positioned on an outer surface of each side 132 and 134 and are sized to fit into the apertures 75 defined in the housing 61. Further included is a comb 135 with a plurality of grooves in which a plurality of springs (not shown) may be disposed within. A window 137 is defined between the comb 135 and a bottom 138 of the spring insert 130.

In FIGS. 17 and 18, a front entry clip 170 is shown in accordance with an example embodiment of the present invention. The front entry clip 170 includes a front 171 and a plurality of arms 172 extending rearwardly from the front 171. The arms 172 correspond to the grooves formed by the comb 135 of the spring insert 130. The front entry clip 170 is sized so as to fit in the window 137 and the arms 172 are formed so as to engage the grooves in the comb 135.

Figures 19, 20:
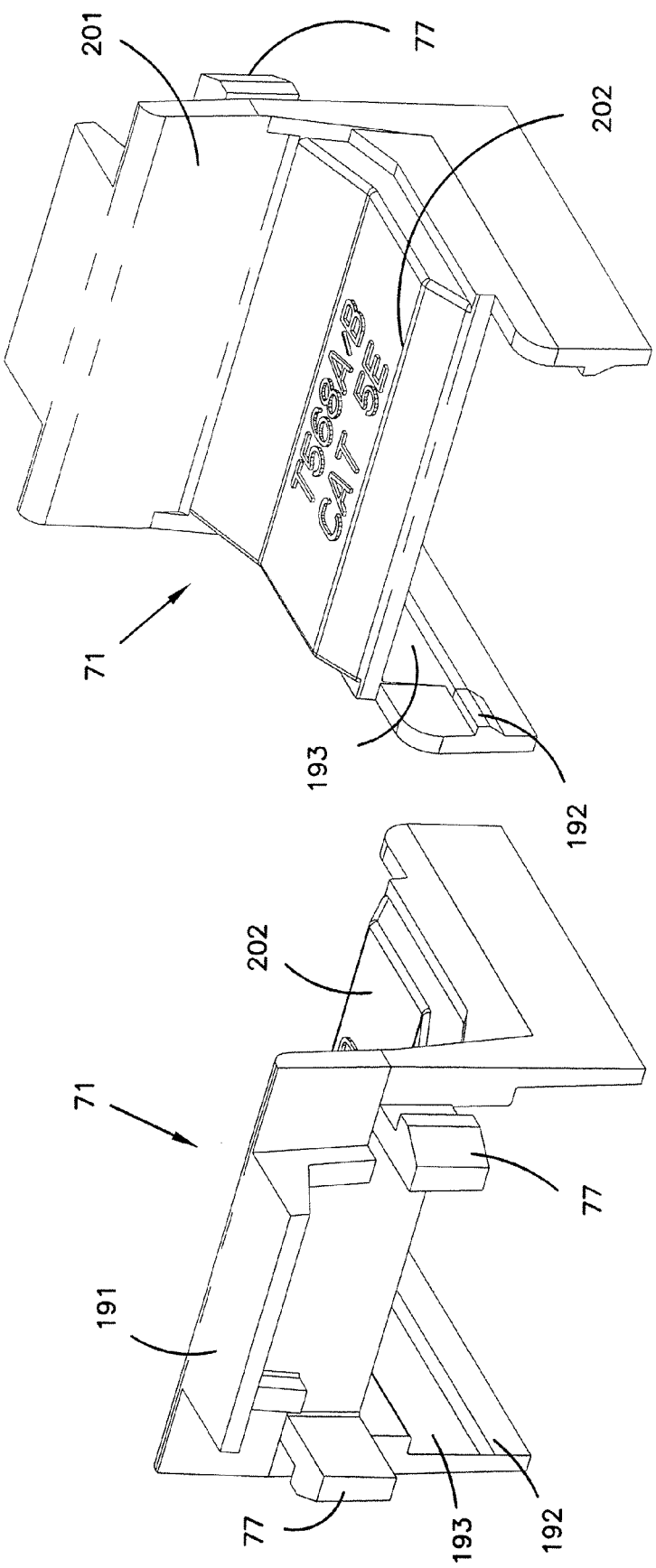
FIGS. 19–21 are front perspective, rear perspective, and side views, respectively, of an embodiment of a cover in accordance with the present invention.
Figure 21:
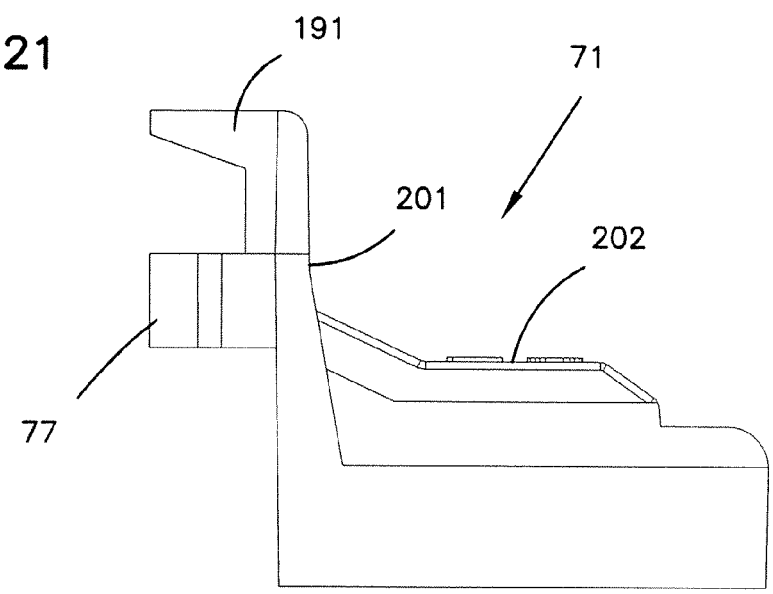

The cover 71 is illustrated in FIGS. 19–21, including an angled portion 201 and a modular portion 202. The cover 71 generally functions to protect the board 78 (described below) from dust and other debris. The angled portion 201 protects the rear 111 and springs 74 of the angled jack 16 and the modular portion 202 protects the electrical connections made with the modular jack 36. Railways 192 are defined in inner surfaces 193 of the cover 71 sized so as to slidingly engage the board 78, as shown below. The locking tabs 77 are positioned to engage the apertures 75 on the housing 61.

Figure 22:
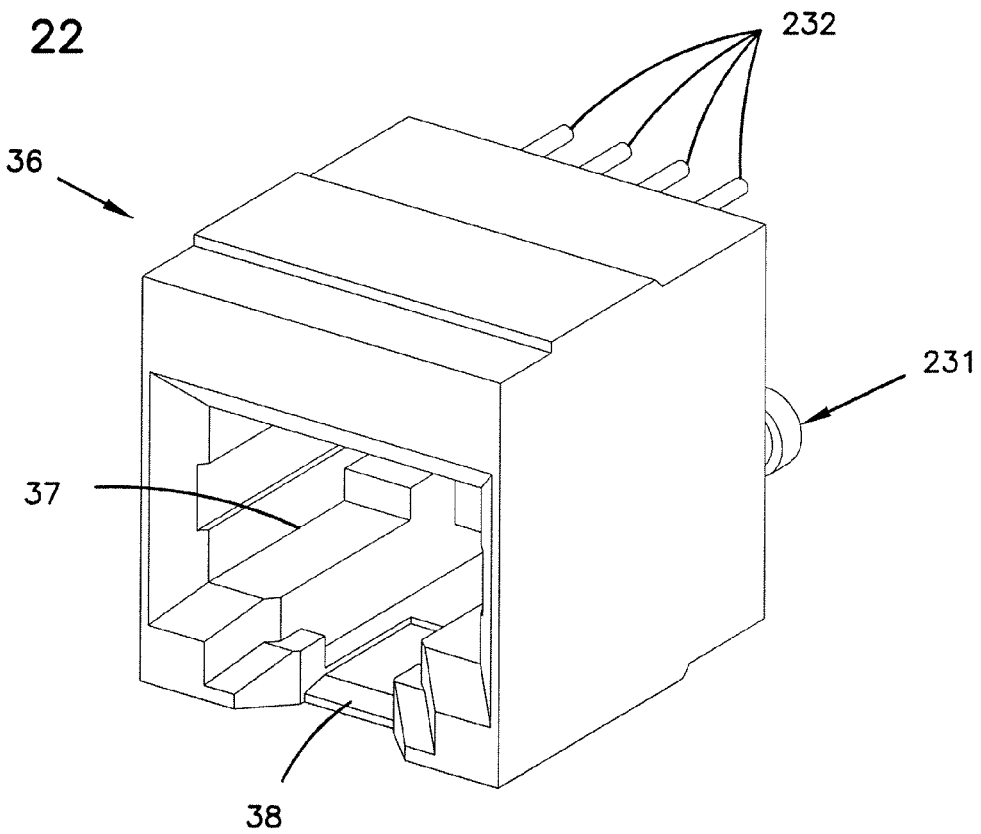
FIGS. 22–24 are front perspective, rear perspective, and front views, respectively, of an embodiment of a modular jack in accordance with the present invention.
Figure 23:
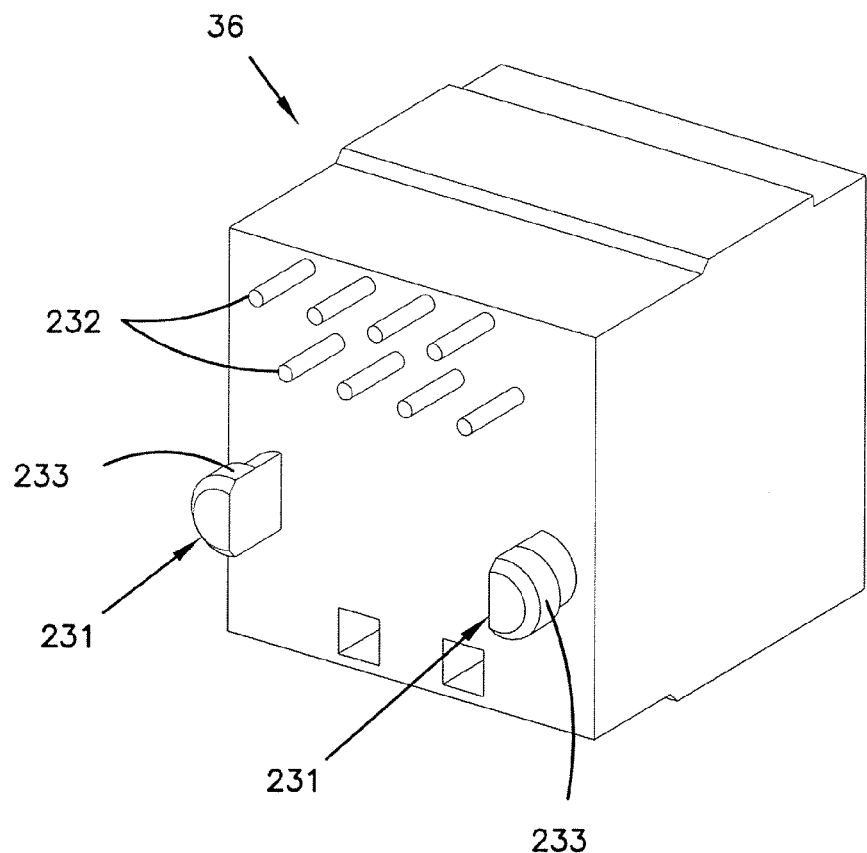
Figure 24:
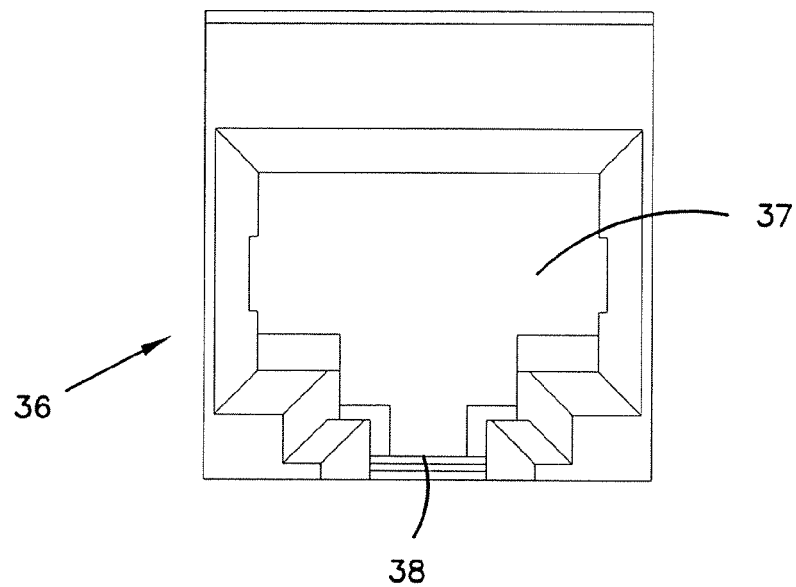

Referring now to FIGS. 22–24, the modular jack 36 is shown including the port 37 and the latch groove 38. The modular jack 36 further includes pins 232 used to make electrical connection with the board 78 and tabs 231 with increased circumferential ends 233 to engage apertures 281 defined by the board 78 so as to hold the modular jack 36 in place. In an example embodiment of the invention, a commercially available RJ-45 jack, made by Stewart Connector Systems with model number SS-7188V-A-NF, is used for the modular jack 36.

It should be understood that other jacks may also be used instead of jacks 16 and 36 without departing from the spirit of the invention. The alternative jacks could be mounted together in any convenient manner and provided with retention structure for positioning each jack angled toward the same end of the patch panel.

Figure 25:
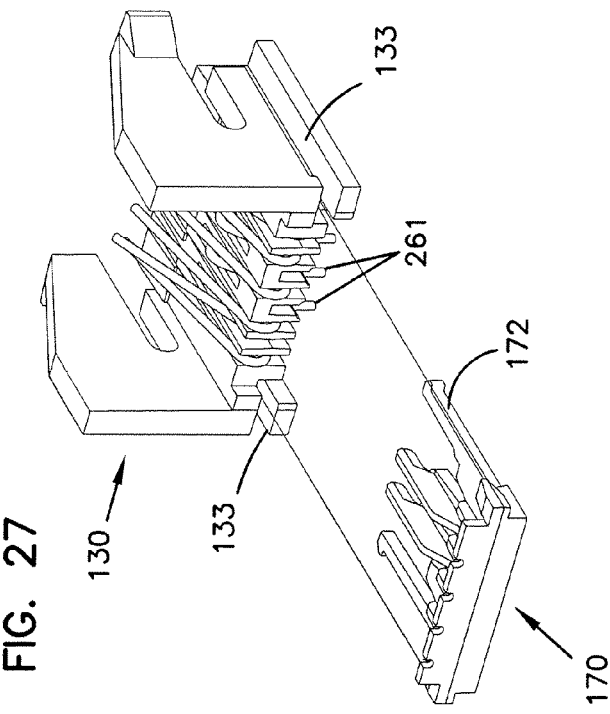
FIGS. 25–27 are perspective views illustrating assembly of an embodiment of a spring insert, including a plurality of springs and a front entry clip, in accordance with the present invention.
Figure 27:
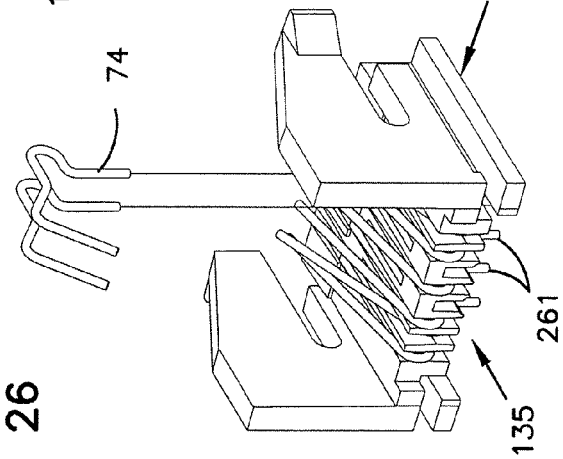
Figure 26:
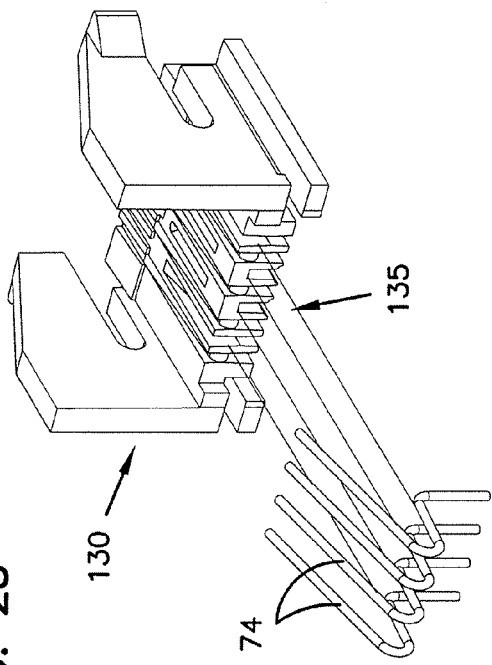

FIGS. 25–31 generally illustrate an example method for assembling the electrical connector assembly 15 in accordance with the present invention. In FIGS. 25–26, the springs 74 are inserted into the grooves of the comb 135 of the spring insert 130. As illustrated, different types of springs 74 may be used, including springs bent to different angles and springs with contact portions running in opposite directions. A spring tip 261 of each spring 74 extends below the bottom 138 of the spring insert 130. In FIG. 27, the front entry clip 170 is inserted into the spring insert 130 in the window 137, so that at least a portion of the arms 172 of the front entry clip 170 slidingly engage the spring insert 130.

Figure 28:
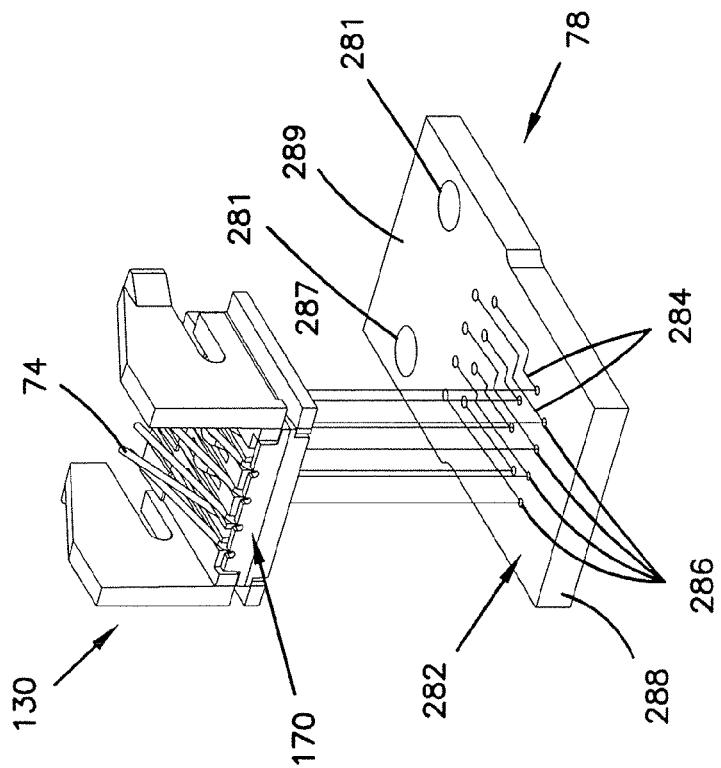

In FIG. 28, the spring insert 130 is coupled to the board 78 at a first end 288. The board 78 may be constructed of any dielectric material, such as PCB, and includes electrical connections 286 and electrical connections 287 defined by the board 78. Further included are tracings 284, which may be etched into the board 78, so as to connect the electrical connections 286 with the electrical connections 287 in a variety of arrangements. The spring insert 130 is coupled to a top surface 282 of the board 78 by inserting the spring tips 261 of the springs 74 into the electrical connections 286 and soldering the spring tips 261 to the board 78.

Figure 29:
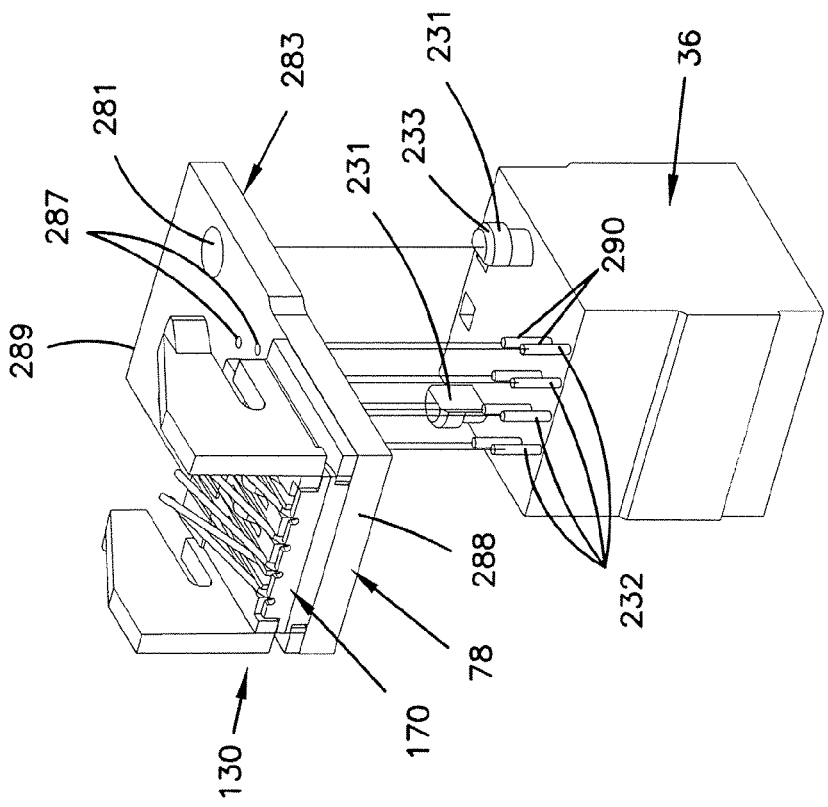
FIGS. 28 and 29 are perspective views illustrating assembly of an embodiment of a spring insert and a modular jack onto a board in accordance with the present invention.

In FIG. 29, the modular jack 36 is coupled to the board 78 on a bottom surface 283 and a second end 289 by inserting spring tips 290 of the pins 232 into the electrical connections 287 and inserting the tabs 231 into the apertures 281 defined by the board 78. The spring tips 290 are soldered to the board 78. The increased circumferential ends 233 of the tabs 231 ate sized so as to engage an inner circumference of the apertures 281 to hold the modular jack 36 and the board 78 together.

In FIG. 30, the housing 61 is slidingly engaged with the board 78 and the spring insert 130. The first end 288 of the board is slide along the grooves 132 of the housing 61, and the railways 133 of the spring insert 130 are slid along the complementary rails 131 of the housing 61. The housing 61 is slid toward the second end 289 of the board 78 until the locking tabs 76 of the spring insert 130 are disposed within the apertures 75 defined by the housing 61, so as to lock the housing 61 into place. In this locked position, the springs 74 are accessible through the port 17.

In FIG. 31, the cover 71 is slidingly engaged on the board 78 by sliding the second end 289 of the board 78 into the railways 192 until the locking tabs 77 engage the apertures 75 in the housing 61, thereby locking the cover 71 into place. The modular portion 202 of the cover 71 positioned in this manner protects the electrical connections 287 and the tracings 284 on the board 78 as well as the pins 232. The angled portion 201 of the cover 71 protects the springs 74 of the angled jack 16.

FIGS. 32–35 illustrated an example method for coupling the electrical connector assembly 15 with the patch panel 10. In FIG. 32, the electrical connector assembly 15 is positioned generally adjacent the front surface 11 of the patch panel 10 with the modular jack 36 aligned with one of the connector locations 61 between the first side 66 and the second side 68. The electrical connector assembly 15 is then moved perpendicularly with respect to the patch panel 10 in a direction A so that the modular jack 36 is moved partially through the connector location 61.

In FIG. 33, the electrical connector assembly 15 is slightly turned and moved in a direction B until, as is shown in FIG. 34, the modular jack 36 and the modular portion 202 of the cover 71 clear the patch panel 10. The electrical connector assembly 15 is then moved at a direction C until notch 64 on the angled jack 16 engages the first side 66 of the connector location 61 and the latch 63 passes through the connector location 61 and the shoulders 62 engages the front surface 11 of the patch panel 10. In this position, the latch 63 is positioned to contact the rear surface 31 of the patch panel 10 and the shoulders engage the front surface 11 so as to surround the first side 66 of the connector location 61 to releasably lock the electrical connector assembly 15 into place.

The connector assemblies 15 in FIGS. 32–35 are angled in the same direction, such as for group 13 in FIG. 1. A second group, group 12 in FIG. 1, can be angled in the opposite direction by following a similar method, but in an opposite direction.

By angling the jacks in two directions, as for connector assemblies 12 and 13, cable management is enhanced for the patch cords. Less strain is placed on the cords by angling the cords to the ends of the panel. Typically the panel is mounted to a rack including vertical cable guides. The angling of the cords toward the guides helps reduce cable stress from high bending angles and improves cable organization.

The above specification, examples and data provide a complete description of the manufacture and of the invention. Since many embodiments of the invention can be made without departing from the spirit and scope of the invention, the invention resides in the claims hereinafter appended.

What is claimed is:

1. A telecommunications parch panel for connecting patch cords, comprising:
    a panel frame including first and second panel sides; and
    a plurality of connector assemblies, each of the connector assemblies including:
        a first jack including a first jack housing defining a first port;
        a second jack including a second jack housing defining a second port, the first jack being electrically connected to the second jack to form a jack pair such that the first port of the first jack forms a 90-degree angle with respect to the second port of the second jack, and the first jack being coupled to the second jack through the panel frame;
        a board including first and second ends and top and bottom surfaces, the first jack being coupled to the first end and the top surface of the board so that the first port opens outwardly in parallel with the first end, and the second jack being coupled to the second end and the bottom surface so that the second port opens outwardly perpendicular to the bottom surface, the board including electrical connections between the first jack and the second jack;
        wherein the first port of the first jack and the second port of the second jack are each positioned at an angle less than 90-degrees with respect to the first and second panel sides, respectively, such that the first and second ports are each angled towards the first end of the panel frame so that patch cords extending from plugs engaged with the first and second jacks are directed towards the first end of the panel frame; and
        wherein a first line running through the first port of the first jack is perpendicular to a second line running through the second part of the second jack, and wherein the first line and the second line intersect outside the first and second housings.

2. The telecommunications patch panel of claim 1, wherein the first housing of the first jack defines a first latch groove and the second housing of the second jack defines a second latch groove, wherein the first latch groove is positioned at an outermost edge of the first jack housing in relation to the first panel side, and wherein the second latch groove is positioned at an outermost edge of the second jack housing in relation to the second panel side.

3. The telecommunications patch panel of claim 2, wherein the plurality of connector assemblies are releasably coupled to the panel frame.

4. The telecommunications patch panel of claim 3, wherein the angle is 45 degrees.

5. The telecommunications patch panel of claim 4, wherein the first jack includes a plurality of first springs, and the second jack includes a plurality of second springs, wherein the first springs are electrically connected to the second springs through the electrical connections of the board.

6. The telecommunications patch panel of claim 1, wherein the plurality of connector assemblies are releasably coupled to the panel frame.

7. The telecommunications patch panel of claim 1, wherein the angle is 45 degrees.

8. The telecommunications patch panel of claim 1, wherein the first jack includes a plurality of first springs, and the second jack includes a plurality of second springs, wherein the first springs are electrically connected to the second springs through the electrical connections of the board.

9. The telecommunications patch panel of claim 8, wherein none of the electrical connections cross one another on the board.

10. The telecommunications patch panel of claim 8, wherein the second jack includes a plurality of pins, each of the pins being electrically connected respectively to one of each of the second springs, and each of the pins extending from the second jack and being electrically connected to one of the electrical connections.

* * * * *

UNITED STATES PATENT AND TRADEMARK OFFICE
CERTIFICATE OF CORRECTION

PATENT NO. : 7,241,182 B2 Page 1 of 1
APPLICATION NO. : 11/382106
DATED : July 10, 2007
INVENTOR(S) : Clark et al.

It is certified that error appears in the above-identified patent and that said Letters Patent is hereby corrected as shown below:

Title page, item (56) References Cited, Other Publications: insert --ATS, Inc., "UTP Slim Line™ Adapter Category 5E Products," http://www.atsats.com/products/slim.htm, 3 pages (Printed July 18, 2001)-- in appropriate order Col. 6, line 65: "231 ate sized so as" should read --231 are sized so as--

Col. 7, line 59, claim 1: "telecommunications parch panel" should read --telecommunications patch panel--

Signed and Sealed this

Eighteenth Day of September, 2007

JON W. DUDAS
*Director of the United States Patent and Trademark Office*